US009512836B2

(12) United States Patent
Shaull et al.

(10) Patent No.: US 9,512,836 B2
(45) Date of Patent: Dec. 6, 2016

(54) FUEL PUMP FOR AN INTERNAL COMBUSTION ENGINE

(71) Applicant: Cummins Inc., Columbus, IN (US)

(72) Inventors: Anthony A. Shaull, Columbus, IN (US); Wesley R. Thayer, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/739,786

(22) Filed: Jun. 15, 2015

(65) Prior Publication Data

US 2015/0275892 A1     Oct. 1, 2015

Related U.S. Application Data

(63) Continuation of application No. 13/736,730, filed on Jan. 8, 2013.

(51) Int. Cl.
  *F02M 59/46* (2006.01)
  *F04B 49/22* (2006.01)
  (Continued)

(52) U.S. Cl.
  CPC ........ *F04B 53/109* (2013.01); *F02M 37/0023* (2013.01); *F02M 59/464* (2013.01);
  (Continued)

(58) Field of Classification Search
  CPC .. F02M 59/462; F02M 59/464; F02M 59/367; F02M 59/46; F02M 37/0023; F02M 63/0031; F02M 63/0033; F04B 49/225; F04B 49/22; F04B 49/243; F04B 53/10; F04B 53/109; F04B 53/1092; F04B 19/22; F04B 49/24; F04B 53/14; F04B 53/16; F04B 53/1087; F04B 7/04; F16K 15/025; F16K 15/026

(Continued)

(56) References Cited

U.S. PATENT DOCUMENTS 3,676,026 A     7/1972   Tupper et al.
3,709,638 A  *  1/1973   Iguchi ................... F04B 15/04
                                                     417/454

(Continued)

FOREIGN PATENT DOCUMENTS

DE     1020080 45 730    3/2009
GB          2 385 385    8/2003
WO       WO-2011/068524  6/2011

OTHER PUBLICATIONS

International Search Report and Written Opinion Dated Apr. 10, 2014, issued in PCT/US2014/010693.

*Primary Examiner* — Alexander Comley
*Assistant Examiner* — Nathan Zollinger
(74) *Attorney, Agent, or Firm* — Foley & Lardner LLP (57) ABSTRACT

A high-pressure fuel pump for an internal combustion engine. The high-pressure fuel pump includes an improved configuration that beneficially simplifies certain features of the high-pressure fuel pump. The fuel pump possesses an inlet check valve positioned along an inlet fuel circuit and an outlet fuel circuit of the high-pressure pump that provides a path for a low-pressure inlet fuel flow to and a path for a high-pressure output fuel flow from a pumping chamber of the fuel pump. Because of the configuration of the inlet check valve and the outlet check valve, the complexity of high-pressure fuel pump is beneficially reduced, decreasing the cost of components and assembly and improving the life and reliability of high-pressure fuel pump.

19 Claims, 5 Drawing Sheets

(51) Int. Cl.
  *F16K 15/02*   (2006.01)
  *F04B 53/10*   (2006.01)
  *F04B 19/22*   (2006.01)
  *F02M 37/00*   (2006.01)
  *F02M 63/00*   (2006.01)
  *F04B 7/04*    (2006.01)
  *F04B 49/24*   (2006.01)
  *F04B 53/14*   (2006.01)
  *F04B 53/16*   (2006.01)

(52) U.S. Cl.
  CPC .......... *F02M 63/0033* (2013.01); *F04B 7/04* (2013.01); *F04B 19/22* (2013.01); *F04B 49/22* (2013.01); *F04B 49/24* (2013.01); *F04B 49/243* (2013.01); *F04B 53/10* (2013.01); *F04B 53/1087* (2013.01); *F04B 53/1092* (2013.01); *F04B 53/14* (2013.01); *F04B 53/16* (2013.01); *F16K 15/025* (2013.01); *F16K 15/026* (2013.01)

(58) Field of Classification Search
  USPC ........ 417/567, 273, 454; 92/171.2; 251/176, 251/186, 337; 123/467, 446
  See application file for complete search history.

(56) References Cited

U.S. PATENT DOCUMENTS

| | | | |
|---|---|---|---|
| 4,427,347 A * | 1/1984 | Augustin | F02M 59/462 417/296 |
| 4,551,077 A * | 11/1985 | Pacht | F04B 53/1022 417/454 |
| 4,807,576 A | 2/1989 | Sonoda et al. | |
| 5,404,855 A | 4/1995 | Yen et al. | |
| 5,700,139 A * | 12/1997 | Rodriguez-Amaya | F02M 41/1411 123/450 |
| 5,732,730 A | 3/1998 | Shoemaker et al. | |
| 5,839,414 A * | 11/1998 | Klinger | F02M 59/462 123/467 |
| 5,983,863 A | 11/1999 | Cavanagh et al. | |
| 6,016,790 A | 1/2000 | Makino et al. | |
| 6,095,774 A | 8/2000 | Tanaka et al. | |
| 7,540,274 B2 | 6/2009 | Yamada et al. | |
| 7,819,107 B2 | 10/2010 | Stockner et al. | |
| 7,950,370 B2 | 5/2011 | Lucas et al. | |
| 2007/0169822 A1 | 7/2007 | Roe et al. | |
| 2010/0147267 A1 | 6/2010 | Kato et al. | |
| 2011/0032675 A1 | 2/2011 | Lian et al. | |
| 2011/0126804 A1 | 6/2011 | Lucas et al. | |

* cited by examiner

FIG.5

FUEL PUMP FOR AN INTERNAL COMBUSTION ENGINE

CROSS-REFERENCE TO RELATED PATENT APPLICATIONS

This application is a Continuation of U.S. patent application Ser. No. 13/736,730, filed Jan. 8, 2013, the contents of which are incorporated herein by reference in its entirety.

TECHNICAL FIELD

This disclosure relates to a fuel pump for an internal combustion engine. More specifically, this disclosure relates to check valves for a fuel pump that permit fuel to enter and exit the fuel pump.

BACKGROUND

Fuel pumps are typically associated with valves to permit fuel flow into the fuel pump and from the fuel pump to one or more fuel injectors. An accumulator may be positioned downstream from the fuel pump and upstream from the fuel injectors.

One type of valve associated with a fuel pump is an inlet check valve, which permits fuel to flow into the fuel pump from a fuel tank. Another type of valve associated with a fuel pump is an outlet check valve, which permits pressurized fuel to flow from the fuel pump to an accumulator or fuel rail or to one or more fuel injectors. These valves are positioned in a fuel pump or in proximity to a fuel pump by way of complex components and assemblies.

SUMMARY

This disclosure provides a fuel pump for an internal combustion engine comprising a pump housing and a pumping unit. The pumping unit is mounted in the pump housing and includes a pumping barrel having a longitudinal axis, a barrel bore extending along the longitudinal axis, a pumping plunger positioned within the barrel bore to form a pumping chamber, an inlet check valve cavity, and an inlet check valve positioned in the inlet check valve cavity. The pumping plunger is mounted for reciprocal movement through an intake stroke to receive fuel in the pumping chamber and a pressure stroke to pump fuel under high pressure from the pumping chamber. The inlet check valve cavity is in fluid communication with the pumping chamber. The inlet check valve includes an inlet check valve plunger mounted for reciprocal movement in the inlet check valve cavity. The inlet check valve cavity is positioned to receive an inlet flow of fuel for delivery to the pumping chamber during the pumping plunger intake stroke and positioned to receive high-pressure fuel from the pumping chamber during the pumping plunger pressure stroke.

This disclosure also provides a pumping unit for a fuel pump of an internal combustion engine comprising a pumping plunger, an inlet check valve cavity, and an inlet check valve. The pumping plunger is positioned in a bore extending along a longitudinal axis of the pumping unit to form a pumping chamber. The pumping plunger is mounted for reciprocal movement through an intake stroke to receive fuel in the pumping chamber and a pressure stroke to pump fuel from the pumping chamber. The inlet check valve is positioned in the inlet check valve cavity and the inlet check valve includes an inlet check valve plunger mounted for reciprocal movement in the inlet check valve cavity. The inlet check valve cavity is positioned to receive an inlet flow of fuel for delivery to the pumping chamber during the pumping plunger intake stroke and positioned to receive high-pressure fuel from the pumping chamber during the pumping plunger pressure stroke. The inlet check valve plunger includes a passage to receive high-pressure fuel during the pumping plunger pressure stroke.

This disclosure also provides a fuel pump for an internal combustion engine comprising a bore, a pumping plunger, a high-pressure fuel outlet, an inlet fuel circuit, an outlet fuel circuit, an outlet check valve, and an inlet check valve. The pumping plunger is positioned in the bore to form a pumping chamber. The inlet fuel circuit is connected to the pumping chamber to provide an inlet flow of fuel to the pumping chamber. The outlet fuel circuit connects the pumping chamber to the high-pressure fuel outlet to provide an outlet flow of high-pressure fuel from the pumping chamber. The outlet check valve is positioned along the outlet fuel circuit downstream from the pumping chamber and upstream from the high-pressure fuel outlet. The inlet check valve is positioned along the inlet fuel circuit upstream from the pumping chamber to receive fuel for delivery to the pumping chamber during the pumping plunger intake stroke. The inlet check valve is positioned along the outlet fuel circuit upstream from the outlet check valve and downstream from the pumping chamber to receive high-pressure fuel from the pumping chamber during the pumping plunger pressure stroke.

Advantages and features of the embodiments of this disclosure will become more apparent from the following detailed description of exemplary embodiments when viewed in conjunction with the accompanying drawings.

DETAILED DESCRIPTION

Figure 1:
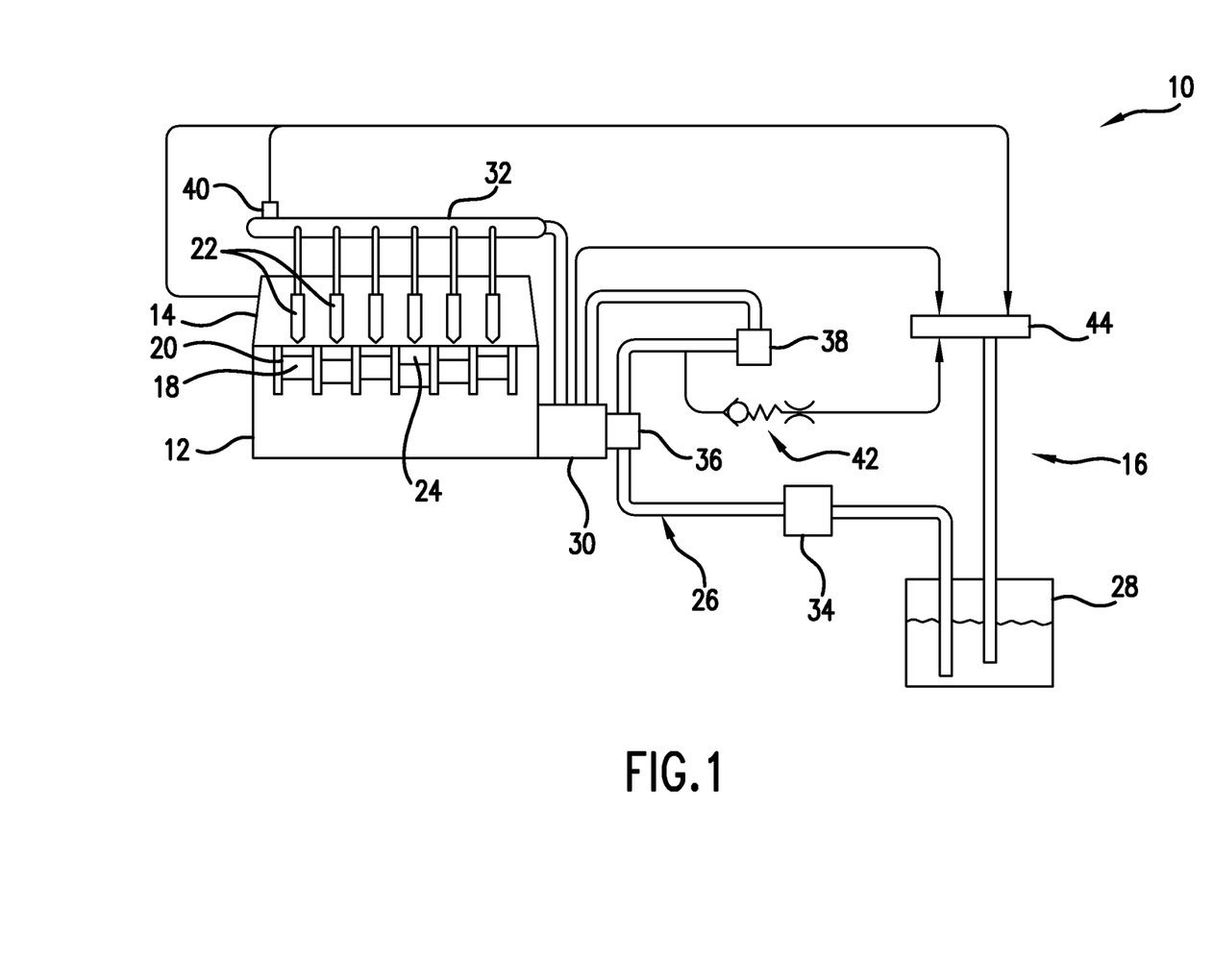
FIG. 1 is a view of a schematic of an internal combustion engine incorporating an exemplary embodiment fuel pump of the present disclosure.
Figure 2:
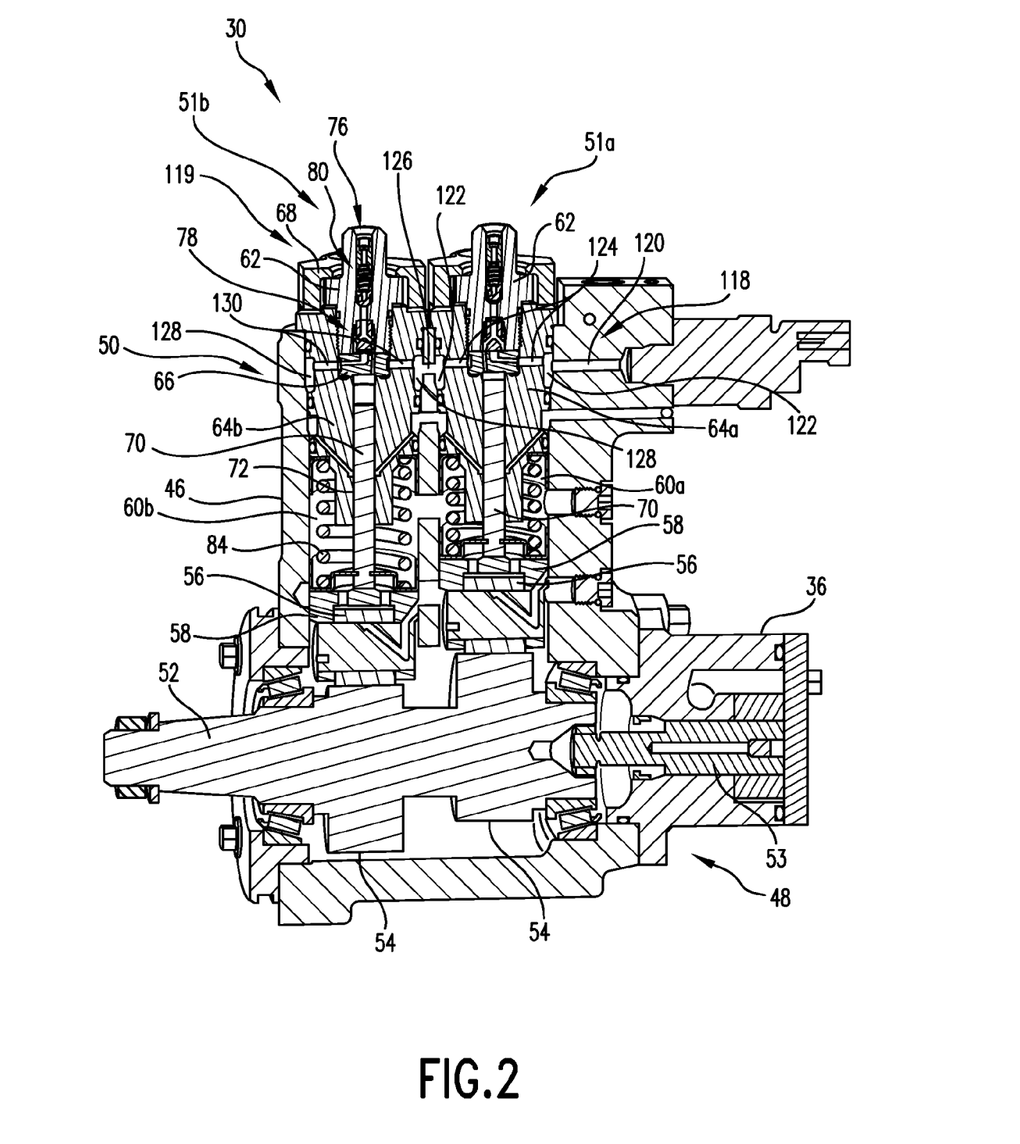
FIG. 2 is a sectional view of the fuel pump of the internal combustion engine of FIG. 2.

Referring to FIG. 1, a portion of a conventional internal combustion engine is shown as a simplified schematic and generally indicated at 10. Engine 10 includes an engine block 12, a cylinder head 14, and a fuel system 16. Fuel system 16 includes a high-pressure fuel pump 30. As shown in FIG. 2, fuel pump 30 includes a drive portion 48 and a pumping portion 50. Pumping portion 50 includes a configuration that uses fewer components for simplified assembly. Among other features, pumping portion 50 provides for an inlet check valve and an outlet check valve positioned in a pumping unit of pumping portion 50. The inlet check valve and the outlet check valve may be positioned within an outlet fitting of high-pressure fuel pump 30. The inlet check valve provides a path for low-pressure inlet fuel flow and a path for high-pressure output fuel flow. A bias spring for an inlet check valve plunger may be positioned in a location separated from fuel flow, decreasing wear on the bias spring. Because the complexity of high-pressure fuel pump 30 is beneficially reduced, the cost of components and the labor needed to assemble the components of high-pressure fuel pump 30 are beneficially reduced. The decreased complexity and arrangement of components improves the life and reliability of high-pressure fuel pump 30.

Cylinder head 14 is attached to engine block 12. Engine block 12 includes a plurality of pistons 18, a plurality of cylinders 20, and a plurality of combustion chambers 24. Pistons 18 are positioned for reciprocal movement in engine cylinders 20, with one piston 18 positioned in each engine cylinder 20. Cylinder head 14 includes a plurality of fuel injectors 22, which are positioned within cylinder head 14. Fuel injectors 22 are fluidly connected to combustion chambers 24, each of which is formed by one piston 18, cylinder head 14, and the portion of engine cylinder 20 that extends between piston 18 and cylinder head 14.

Fuel system 16 provides fuel to injectors 22, which then flows into combustion chambers 24, or is injected into combustion chambers 24 by the action of fuel injectors 22. Fuel system 16 includes a fuel circuit 26, a fuel tank 28, which contains a fuel, high-pressure fuel pump 30 positioned along fuel circuit 26 downstream from fuel tank 28, and a fuel accumulator or rail 32 positioned along fuel circuit 26 downstream from high-pressure fuel pump 30 and upstream from fuel tank 28. Fuel circuit 26 connects fuel accumulator 32 to fuel injectors 22, which then provide controlled amounts of fuel to combustion chambers 24.

Fuel system 16 may also include a low-pressure fuel pump 36 positioned along fuel circuit 26 downstream from fuel tank 28 and upstream from high-pressure fuel pump 30. A first fuel filter 34 may be positioned along fuel circuit 26 downstream from fuel tank 28 and upstream from high-pressure fuel pump 30, and a second fuel filter 38 may be positioned along fuel circuit 26 downstream from low-pressure fuel pump 36 and upstream from high-pressure fuel pump 30. Low-pressure fuel pump 36 increases the pressure of fuel to a first pressure level prior to fuel flowing into high-pressure pump 30, which increases the efficiency of operation of high-pressure fuel pump 30. First fuel filter 34 may be a 10 to 15-micron filter and second fuel filter 38 may be a 5-micron filter.

Fuel system 16 may include other components. For example, a low-pressure manifold 44 may be located upstream from fuel tank 28 and may accept low-pressure fuel from a variety of locations in engine 10. One source of low-pressure fuel may be a pressure relief valve 40, which limits the amount of pressure in fuel accumulator 32. A bypass valve 42 may connect fuel flowing to high-pressure fuel pump 36 from fuel tank 28 with low-pressure manifold 44. Bypass valve 42 may be used in association with high speed motoring of engine 10. Fuel leakage and air bleed from high-pressure fuel pump 30 may also connect to low-pressure manifold 44. Fuel flows downstream from low-pressure manifold 44 along fuel circuit 26 to fuel tank 28.

Figure 3:
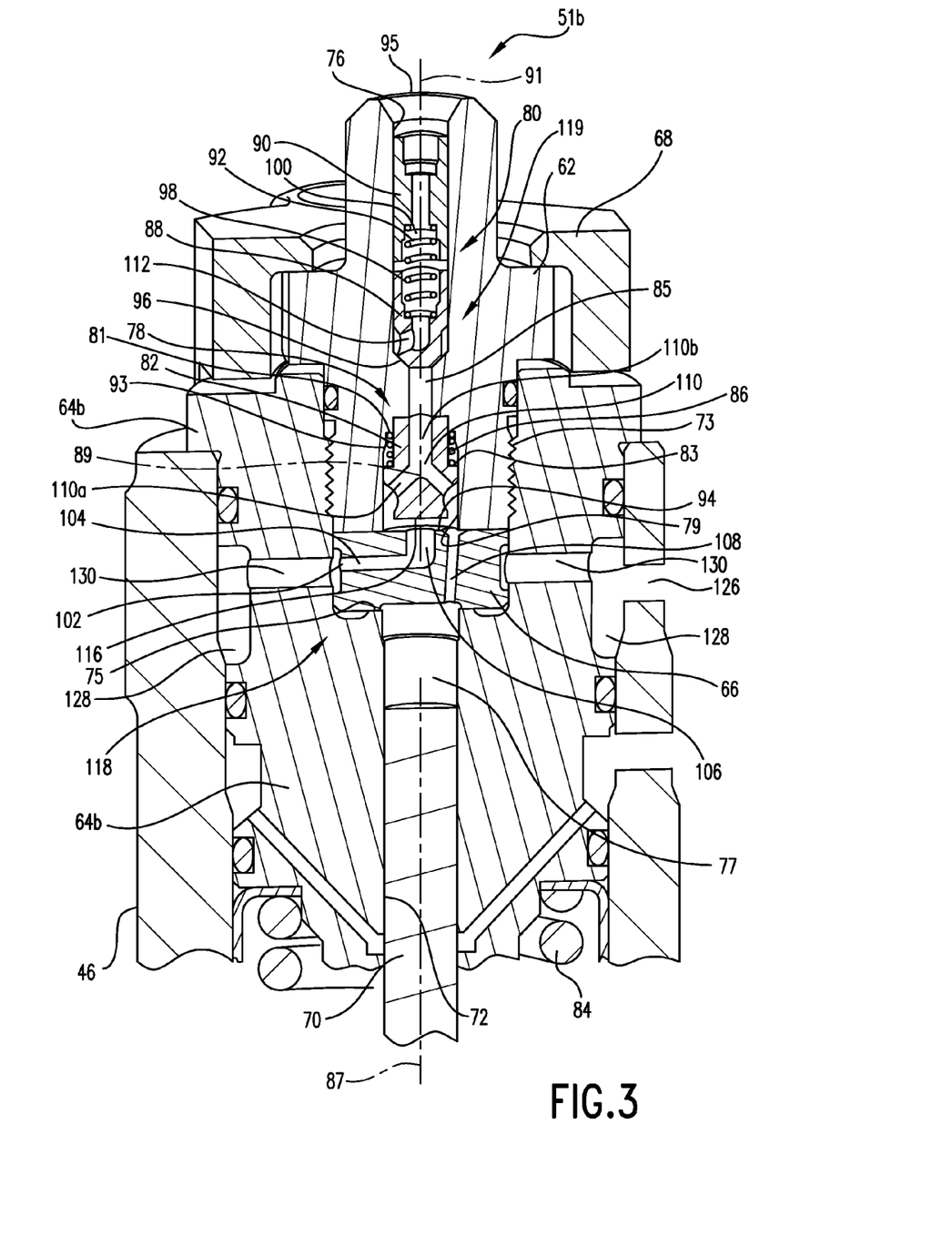
FIG. 3 is a view of a portion of the fuel pump of FIG. 2, with a pump plunger of the fuel pump moving to draw fuel into the fuel pump.
Figure 4:
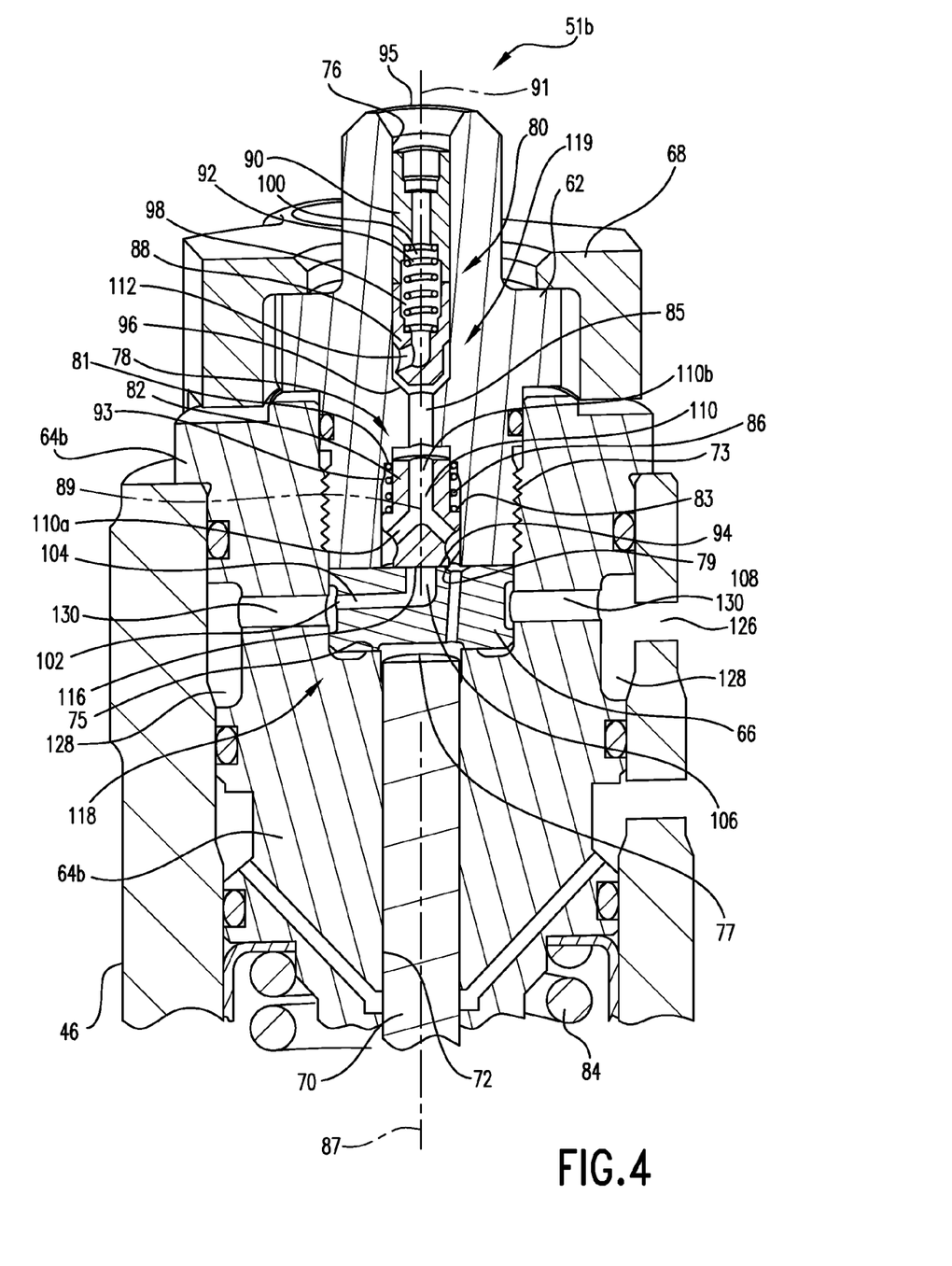
FIG. 4 is a view of a portion of the fuel pump of FIG. 2, with the pump plunger of the fuel pump moving to force fuel toward an outlet of the fuel pump.

Turning now to FIGS. 2-4, fuel pump 30 includes drive portion 48 and pumping portion 50, which are positioned in a fuel pump housing 46. Drive portion 48 includes a shaft 52 that may be driven mechanically by a shaft (not shown) located in engine block 12, by an electrical motor, or by other means. Shaft 52 includes a pair of cams 54 formed or positioned on shaft 52. The action of cams 54 on various components of pumping portion 50 causes pumping portion 50 to move fuel along fuel circuit 26. Low-pressure fuel pump 36 may be attached to housing 46 of high-pressure fuel pump 30. A drive shaft 53 of low-pressure fuel pump 36 may engage shaft 52 of high-pressure fuel pump 30 and thus may be driven by shaft 52.

In the exemplary embodiment, pumping portion 50 includes a first pumping unit 51*a* and a second pumping unit 51*b*. Although two pumping units are shown, only one pumping unit or more than two pumping units may be included in other embodiments. Each pumping unit 51*a* and 51*b* is the same and therefore, for ease of description, the components and features of only pumping unit 51*b* will be described, with the understanding that the description equally applies to pumping unit 51*a*.

Pumping unit 51*b* includes a pumping barrel 64*b*, and an outlet fitting 62. Pumping unit 51*b* also includes a bearing 56, and a bearing housing 58, which, along with pumping barrel 64*b*, are located in a housing bore 60*b* formed in pump housing 46. Bearing housing 58 is biased against cam 54 by a first spring 84. Pumping unit 51*b* also includes an inlet disc 66, and a pump plunger 70. Pumping unit 51*b* further includes a retainer 68, which secures inlet disc 66 and outlet fitting 62 within a barrel recess or cavity 73 formed in pumping barrel 64. For ease of description, bearing housing 58 is at a proximate, near, or first end of pumping unit 51*b* and pumping portion 50, and outlet fitting 62 is at a distal, far, or second end of pumping unit 51*b* and pumping portion 50.

Pumping barrel 64 includes a barrel bore 72, which extends longitudinally into pumping barrel 64 from a proximate end of pumping barrel 64 along a longitudinal axis of pumping barrel 64. A longitudinal axis 87 of barrel bore 72 may be coaxial with the longitudinal axis of pumping barrel 64. Barrel recess 73 of pumping barrel 64 extends into pumping barrel 64 from a distal end of pumping barrel 64. A longitudinal axis of barrel recess 73 may be coaxial with the longitudinal axis of pumping barrel 64 and may be coaxial with longitudinal axis 87 of barrel bore 72. A distal end of barrel bore 72 opens into barrel recess 73. Pump plunger 70 is slidably positioned for reciprocal movement in a longitudinal or axial direction within barrel bore 72. Barrel recess 73 receives inlet disc 66 and outlet fitting 62. Inlet disc 66 is positioned in a proximate end of barrel recess 73 against a raised seat portion 75 formed on pumping barrel 64, and is secured within barrel recess 73 by outlet fitting 62. Outlet fitting 62 is secured in barrel recess 73 by retainer 68. A pumping chamber 77 is formed in barrel bore 72 between a distal end of pump plunger 70 and a proximate side of inlet disc 66.

Inlet disc 66 includes a first passage 102 having a transverse or radial passage portion 104 and a longitudinal or axial passage portion 106 that intersects radial passage portion 104 and extends to a distal end of inlet disc 66. Inlet disc 66 also includes a second passage 108 extending in a longitudinal or axial direction. Second passage 108 may be parallel to axial passage portion 106. Second passage 108 extends from a distal end of inlet disc 66 to a proximate end of inlet disc 66. Second passage 108 is positioned a spaced radial distance from axial passage portion 106. Inlet disc 66 also includes an inlet valve seat 94 formed about axial passage portion 106.

As shaft 52 rotates, cam 54 rotates therewith. Cam 54 contacts bearing 56, which is positioned in bearing housing 58. Rotary movement of cam 54 causes bearing 56, which may rotate about its axis through contact with cam 54, to move bearing housing 58 reciprocally or longitudinally within housing bore 60. As bearing housing 58 moves longitudinally away from a longitudinal axis of shaft 52, it contacts and moves pump plunger 70, which is positioned in barrel bore 72. Longitudinal movement of pump plunger 70 away from the longitudinal axis of shaft 52 causes compression or pressurization of fuel in pumping chamber 77, which may be called a pressure stroke, and longitudinal movement of pump plunger 70 toward the longitudinal axis of shaft 52 draws fuel into pumping chamber 77, which may be called an intake stroke.

Pumping portion 50 also includes a fuel inlet circuit 118 to connect low-pressure fuel to pumping chamber 77 of second pumping unit 51b and a fuel outlet circuit 119 to connect pumping chamber 77 to an outlet of second pumping unit 51b. Fuel inlet circuit 118 may include a plurality of passages to connect fuel entering pumping portion 50 with pumping chamber 77. In the exemplary embodiment, fuel inlet circuit 118 includes an inlet passage 120, a first annular passage 122, a connecting passage 126, a second annular passage 128, one or more second barrel passages 130, first passage 102 formed in inlet disc 66, and second passage 108 formed in inlet disc 66. Inlet passage 120 formed in pump housing 46 connects to fuel tank 28 by way of fuel circuit 26, which provides a source of low-pressure fuel for inlet fuel circuit 118. First annular passage 122 is located between pump housing 46 and pumping barrel 64a and permits fuel to flow from inlet passage 120 into one or more first barrel passages 124 formed in pumping barrel 64a and into connecting passage 126 formed in pump housing 46 between housing bore 60a and housing bore 60b. Second annular passage 128 located between pump housing 46 and pumping barrel 64b permits fuel to flow into one or more second barrel passages 130 formed in pumping barrel 64b.

Second pumping unit 51b includes an inlet check valve 78 positioned in a longitudinally or axially extending inlet check valve cavity or recess 79 for regulating flow of fuel into second pumping unit 51b. Inlet check valve 78 is positioned along fuel inlet circuit 118 downstream from second barrel passage 130 and upstream from pumping chamber 77. More specifically, inlet check valve 78 may be at least partially positioned or received within inlet check valve cavity or recess 79, also positioned along fuel inlet circuit 118. Inlet check cavity 79 may be located within outlet fitting 62, which is secured to pumping barrel 64. An inlet check step 81 may be formed in outlet fitting 62 at a distal end of inlet check cavity 79. Longitudinally extending inlet check cavity 79 includes a longitudinal axis 89 that may be coaxial with longitudinal axis 87 of barrel bore 72.

Inlet check valve 78 includes an inlet check valve plunger 82. Inlet check plunger 82 includes a radially extending portion 83 and a proximate end 116. Inlet check plunger 82 is received in inlet check cavity 79 for reciprocal movement along longitudinal axis 89 of inlet check cavity 79. Thus, longitudinal axis 89 forms a reciprocation axis for inlet check plunger 82. Inlet check valve 78 includes a second spring 86 located inlet check cavity 79. A distal end of second spring 86 is positioned against inlet check step 81. A proximate end of second spring 86 contacts radially extending portion 83 of inlet check plunger 82. Thus second spring 86 is positioned longitudinally between inlet check step 81 of outlet fitting 62 and radially extending portion 83 of inlet check plunger 82. Furthermore, inlet check step 81, radially extending portion 83, a peripheral portion of inlet check plunger 82, and a radial wall of outlet fitting 62 that forms inlet check cavity 79 creates a bias spring pocket, space or cavity 93 in which second spring 86 is located. Second spring 86 biases inlet check plunger 82 toward inlet disc 66, which closes inlet check valve 78, as described herein below.

Fuel outlet circuit 119 includes second passage 108, a recess connecting passage 85, and a high-pressure fuel outlet 95. Inlet check valve 78 is positioned along fuel outlet circuit 119 downstream from pumping chamber 77 and upstream from high-pressure fuel outlet 95. An outlet check valve 80 is positioned along fuel outlet circuit 119 downstream from inlet check valve 78 and upstream from high-pressure fuel outlet 95. More specifically, outlet check valve 80 may be at least partially positioned or received within a longitudinally or axially extending outlet check valve cavity or recess 76, also positioned along fuel outlet circuit 119. Outlet check cavity 76 may be located within outlet fitting 62. Recess connecting passage 85 extends from inlet check cavity 79 to outlet check cavity 76 along a longitudinal or axial direction. High-pressure fuel outlet 95 is positioned at the distal end of outlet check cavity 76.

Outlet check valve 80 includes an outlet check valve plunger 88, which includes an outlet plunger cavity 98, an outlet check retainer 90, which includes a retainer cavity 100, and a third spring 92, all of which are positioned in outlet check cavity 76. Outlet check cavity 76 includes a longitudinal axis 91 that may be coaxial with longitudinal or reciprocation axis 89 of inlet check cavity 79, may be coaxial with longitudinal axis 87 of barrel bore 72, or may be coaxial with both longitudinal axis 87 and longitudinal axis 89. Outlet check plunger 88 contacts an outlet valve seat 96 formed in outlet fitting 62 at the proximate end of check cavity 76. Outlet check retainer 90 is secured a spaced longitudinal distance from outlet check plunger 88, which allows outlet check plunger 88 to move reciprocally in check cavity 76 in an axial or longitudinal direction along longitudinal axis 91 of outlet check cavity 76. Third spring 92 is positioned between outlet check plunger 88 and outlet check retainer 90, and located in outlet plunger cavity 98 and retainer cavity 100. Third spring 92 provides a bias to outlet check plunger 88 in the direction of outlet valve seat 96.

Inlet check plunger 82 includes an inlet plunger passage 110. Inlet plunger passage 110 includes a portion 110a that extends at an angle from a periphery of inlet check plunger 82, and a portion lab, which extends from a distal end of inlet check plunger 82 to intersect inlet plunger passage portion 110a along a longitudinal axis of inlet check plunger 82. Outlet check plunger 88 includes an outlet plunger passage 112 that extends from a peripheral portion of outlet check plunger 88 to connect to outlet plunger cavity 98.

Fuel pump 30 operates as follows. As shaft 52 rotates, which causes cam 54 to rotate, the contact between cam 54 and bearing 56 causes bearing housing 58 to move longitudinally. When bearing housing 58 moves toward the longitudinal axis of shaft 52 by the action of first spring 84, pump plunger 70 also moves longitudinally in the same direction. Pump plunger 70 movement toward shaft 52, which is also the proximate end of pumping portion 50, is an intake stroke for fuel pump 30. During the intake stroke of pump plunger 70, inlet fuel flows through inlet fuel circuit 118 to pumping chamber 77 Fuel under low pressure flows through inlet passage 120, through first annular passage 122, through connecting passage 126, through second annular passage 128, and then into second barrel passage 130 of fuel inlet circuit 118. From second barrel passage 130, fuel flows along inlet fuel circuit 118 into first passage 102. Fuel flows along transverse passage portion 104 of first passage 102 and then flows into longitudinal or axial passage portion 106 of first passage 102. Fuel flows in a distal direction along axial passage portion 106, exiting inlet disc 66 at a distal end of inlet disc 66. The force of the low-pressure fuel flowing along axial passage portion 106 causes inlet check plunger 82 to move longitudinally or axially away from inlet valve seat 94, compressing second spring 86. Fuel then flows transversely or radially through a gap 114 formed between inlet valve seat 94 and proximate end 116 of inlet check plunger 82. Fuel then flows through second passage 108 of fuel inlet circuit 118 in a direction toward the proximate end of pumping portion 50. Thus, the flow of fuel reverses direction as it flows from longitudinal or axial passage portion 106 and then into second passage 108. From second passage 108, the low-pressure fuel flows into pumping chamber 77.

While fuel is flowing through fuel inlet circuit 118 into pumping chamber 77, outlet check plunger 88 is in contact with outlet valve seat 96. Outlet check plunger 88 is positioned in contact with outlet valve seat 96 because the pressure in outlet check cavity 76, which is greater than the pressure against the proximate end of outlet check plunger 88, in combination with the force from third spring 92, keeps outlet check plunger 88 in contact with outlet valve seat 96.

As cam 54 continues to rotate, pump plunger 70 will "bottom out" or reach a point where its direction of travel will reverse so that it will now be moving in a distal direction. As pump plunger 70 moves toward the distal direction, fuel in pumping chamber 77 is subjected to pressure as fuel is forced through fuel outlet circuit 119 toward fuel accumulator 32 during the pressure stroke of pump plunger 70. Fuel flow from first passage 102 slows during the reversal of pump plunger 70, and then stops. As fuel flow stops, proximate end 116 of inlet check plunger 82 moves into contact with inlet valve seat 94 by the action of second spring 86.

As fuel in pumping chamber 77 is moved in a distal direction by the action of pump plunger 70, the fuel, which entered pumping chamber 77 by way of second passage 108, is now under high pressure and flows into fuel outlet circuit 119 from pumping chamber 77 by way of second passage 108. High-pressure fuel flows from second passage 108 into a first end of inlet check cavity 79. Continuing along fuel outlet circuit 119, fuel flows into inlet plunger passage 110a from inlet check cavity 79, and then into inlet plunger passage 110b. Fuel then flows out a second end of inlet check cavity 79, which is opposite the first end, and through recess connecting passage 85 toward outlet check plunger 88. The pressure of the fuel causes outlet check plunger 88 to move longitudinally away from outlet valve seat 96, compressing third spring 92. Fuel continues along fuel outlet circuit 119 into outlet check cavity 76, and then into outlet plunger passage 112. From plunger passage 112, fuel flows through outlet plunger cavity 98 into and through retainer cavity 100. High-pressure fuel flows from outlet check retainer 90 and through distal or high-pressure fuel outlet 95 of outlet fitting 62, thus exiting high-pressure fuel pump 30.

Second spring 86, which is longitudinally between radial extension 83 of inlet check plunger 82 and inlet check step 81, is also positioned a spaced radial distance from inlet plunger passage 110b in spring cavity 93. Because of the size and position of inlet check plunger 82, and more specifically the proximity of radial extension 83 to the radial wall portion of outlet fitting 62 that forms inlet check cavity 79, inlet check plunger 82 blocks nearly all fuel flow between inlet check plunger 82 and outlet fitting 62. Only a minimal amount of leakage fuel flows into spring cavity 93 and across second spring 86. Thus, the position of second spring 86 is beneficial in that second spring 86 is out of the path of flowing high-pressure fuel, which reduces wear on second spring 86.

After exiting high-pressure fuel pump 30, fuel travels to fuel accumulator 32. A control system of internal combustion engine 10, which is not shown, operates fuel injectors 22 in a known manner to provide fuel to combustion chambers 24. A pressure relief valve 40 may relieve pressure in fuel accumulator 32 above a predetermined level. The relieved fuel returns to fuel tank 28, either directly or by way of low-pressure accumulator 44.

As cam 54 continues to rotate, the cycle described above will be repeated.

Figure 5:
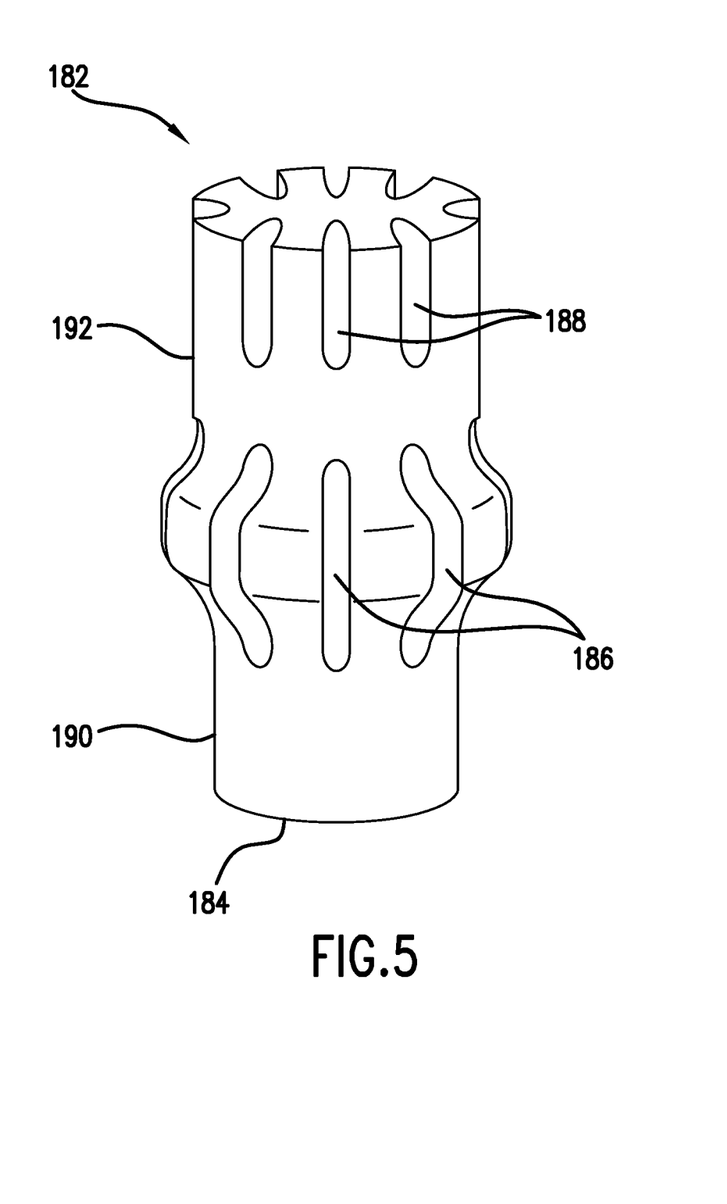
FIG. 5 is a perspective view of an inlet check valve plunger m accordance with an alternative embodiment of the present disclosure.

While inlet check plunger 82 is shown having an inlet plunger passage 110 formed therein, a check plunger may have other configurations for permitting fuel to flow from the proximate end to the distal end. One such configuration is shown in FIG. 5, which shows a check plunger 182. A proximate end 184 is formed on check plunger 182 to contact inlet valve seat 94, similar to proximate end 116 of inlet check plunger 82. Check plunger 182 also includes one or more longitudinally or axially extending peripheral grooves 186 and one or more longitudinally or axially extending end grooves 188. Check plunger 182 performs the same function as check plunger 82 and may fit in inlet check cavity 79. Pressurized fuel flowing from pumping chamber 77 flows along a lower peripheral portion 190 of check plunger 82 and then into peripheral grooves 186. Fuel next flows along an upper peripheral portion 192 of check plunger 82 and into end grooves 188. Fuel then flows through fuel pump 30 and fuel circuit 26, as previously described.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A fuel pump for an internal combustion engine, comprising:
   a pump housing; and
   a pumping unit mounted in the pump housing, the pumping unit including:
   a pumping barrel having a longitudinal axis, the pumping barrel defining a barrel bore, the barrel bore extending along the longitudinal axis,
   a pumping plunger positioned within the barrel bore so as to define a pumping chamber, the pumping plunger mounted for reciprocal movement through an intake stroke to receive fuel in the pumping chamber and a pressure stroke to pump fuel under high pressure from the pumping chamber,
   an inlet check valve cavity in fluid communication with the pumping chamber,
   an inlet check valve positioned in the inlet check valve cavity, the inlet check valve including an inlet check valve plunger mounted for reciprocal movement in the inlet check valve cavity, the inlet check valve plunger defining an inlet plunger passage in fluid communication with the inlet check valve cavity, and
   an inlet disc positioned between the pumping chamber and the inlet check valve cavity, the inlet disc including:
   at least one first passage fluidly coupling the pumping chamber and the inlet check valve cavity,
   at least one second passage fluidly coupling the inlet check valve cavity and a fluid inlet passage fluidly coupled to at least one corresponding barrel passage in the pumping barrel, and an inlet valve seat adjacent the inlet check valve cavity.

2. The fuel pump of claim 1, wherein the inlet check valve cavity is positioned to receive an inlet flow of fuel for delivery to the pumping chamber during the pumping plunger intake stroke and positioned to receive high-pressure fuel from the pumping chamber during the pumping plunger pressure stroke.

3. The fuel pump of claim 1, wherein the inlet check valve includes a radial extension shaped so as to restrict radial movement of the inlet check valve plunger within the inlet check valve cavity.

4. The fuel pump of claim 1, wherein the at least one first passage extends along the longitudinal axis.

5. The fuel pump of claim 4, wherein the at least one second passage is spaced radially from the at least one first passage.

6. The fuel pump of claim 1, further comprising an outlet fitting threadedly coupled to the pumping barrel, the outlet fitting configured to secure the inlet disc between the pumping chamber and the inlet check valve cavity.

7. The fuel pump of claim 6, wherein the outlet fitting defines the inlet check valve cavity.

8. The fuel pump of claim 6, further comprising:

an outlet check valve cavity defined by the outlet fitting and extending along the longitudinal axis, the outlet check valve cavity in fluid communication with the inlet check valve cavity; and an outlet check valve positioned in the outlet check valve cavity, the outlet check valve including an outlet check valve plunger mounted for reciprocal movement in the outlet check valve cavity.

9. The fuel pump of claim 8, further comprising an outlet valve seat formed in the outlet fitting at a first end of the outlet check valve cavity, the first end being nearest the inlet check valve cavity.

10. The fuel pump of claim 1, further comprising a retainer configured to secure each of the inlet disc and the outlet fitting to the pumping barrel.

11. A fuel pump for an internal combustion engine, comprising:

a pumping barrel having a longitudinal axis, the pumping barrel defining a barrel bore, the barrel bore extending along the longitudinal axis;

a pumping plunger positioned within the barrel bore to define a pumping chamber;

an inlet fuel circuit in fluid communication with the pumping chamber;

an outlet fuel circuit fluidly coupling the pumping chamber and a high-pressure fuel outlet;

an outlet check valve positioned along the outlet fuel circuit downstream of the pumping chamber and upstream of the high-pressure fuel outlet;

an inlet check valve positioned along the inlet fuel circuit upstream of the pumping chamber to receive fuel for delivery to the pumping chamber during a pumping plunger intake stroke, and positioned along the outlet fuel circuit upstream of the outlet check valve and downstream of the pumping chamber, the inlet check valve defining an inlet plunger passage to receive high-pressure fuel from the pumping chamber during a pumping plunger pressure stroke; and an inlet disc positioned along each of the inlet and outlet fuel circuits between the inlet check valve and the pumping chamber and comprising a first passage fluidly coupling an inlet check valve cavity and a fluid inlet passage fluidly coupled through the pumping barrel.

12. The fuel pump of claim 11, wherein the inlet disc includes a second passage spaced radially from the first passage and fluidly coupling the inlet check valve cavity and the pumping chamber.

13. The fuel pump of claim 11, further comprising an inlet valve seat formed in the inlet disc.

14. The fuel pump of claim 11, further comprising an outlet fitting, wherein each of the inlet and outlet check valves are positioned at least in part within the outlet fitting.

15. The fuel pump of claim 14, wherein the outlet fitting defines the inlet check valve cavity, wherein the inlet check valve is positioned at least in part within the inlet check valve cavity.

16. The fuel pump of claim 15, wherein the inlet check valve includes a radial extension shaped so as to restrict radial movement of an inlet check valve plunger within the inlet check valve cavity.

17. The fuel pump of claim 15, wherein the outlet fitting is threadedly coupled to the pumping barrel, the outlet fitting being configured to secure the inlet disc between the pumping chamber and the inlet check valve cavity.

18. The fuel pump of claim 14, wherein the outlet fitting defines an outlet valve seat.

19. The fuel pump of claim 11, further comprising a retainer configured to secure each of the inlet disc and the outlet fitting to the pumping barrel.

* * * * *